Patented Mar. 15, 1938

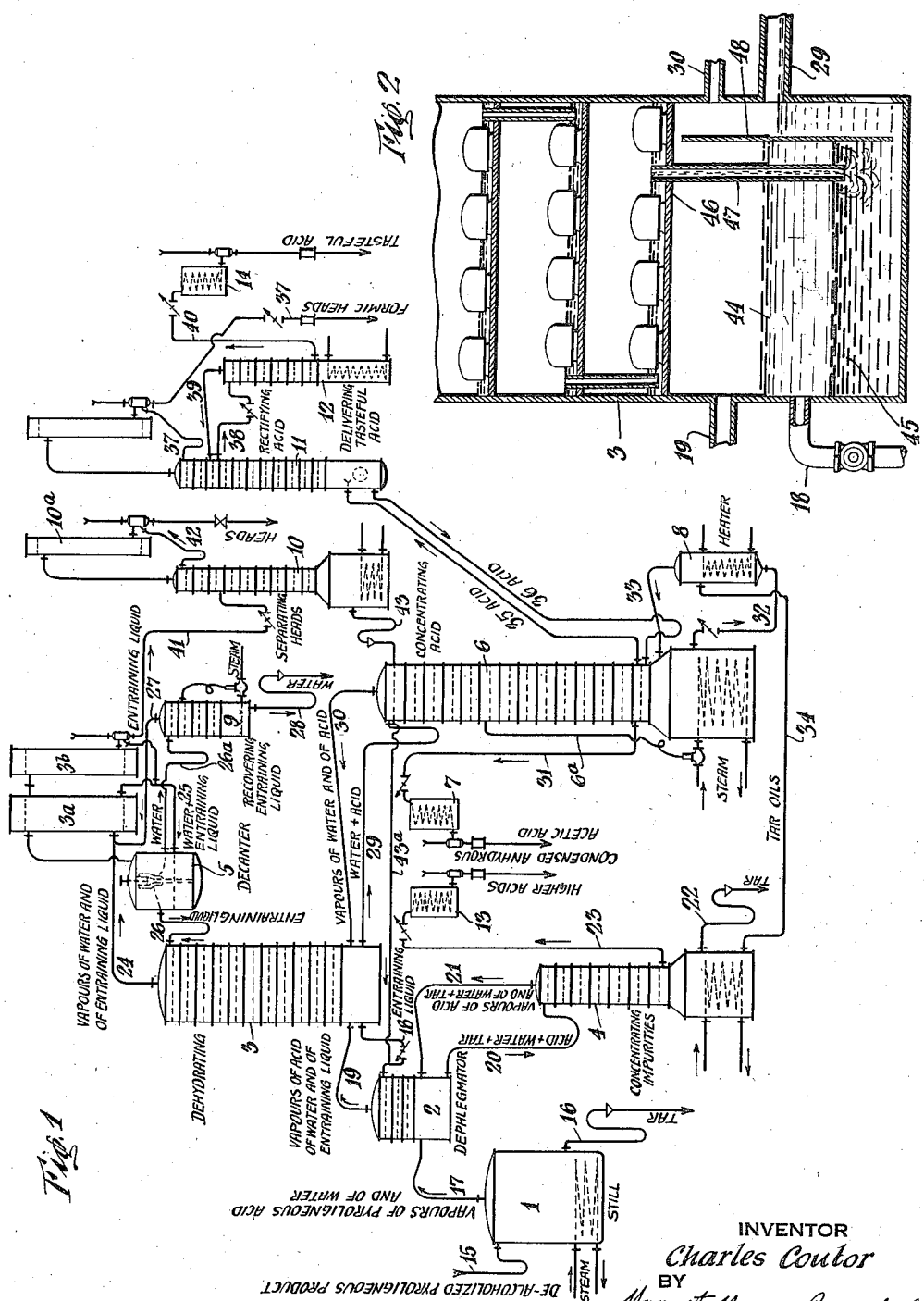

2,111,140

UNITED STATES PATENT OFFICE 2,111,140

PROCESS FOR CONCENTRATING ACETIC ACIDS

Charles Coutor, Premery, France, assignor to Société Anonyme: Établissements Lambiotte Frères, Premery, France Application November 27, 1936, Serial No. 112,859
In France September 7, 1933

7 Claims. (Cl. 202—42)

It is well known to concentrate aqueous solutions of acetic acid by distillation in the presence of auxiliary substances: Marckwald in the year of 1904 used xylol (D. R. P. No. 172,931); Evence Coppee used toluol, ethers, ketones (F. P. Nos. 558,875 and 565,265) and ever since a great many methods have been proposed which employ certain ethers, ketones, wood oils and oxygen containing substances.

In general these entraining liquids may be divided into two general classes: those having a relatively low boiling point as compared with the boiling point of acetic acid, for example, low boiling point organic halides such as ethylene dichloride, and which can be separated from anhydrous acetic acid by distillation should the anhydrous acid become mixed with the entraining liquid; and secondly those comprising the higher boiling point entraining liquids which have a boiling point around or higher than the boiling point of acetic acid or which form constant boiling mixtures therewith, so that if the anhydrous acetic acid becomes mixed with such an entraining liquid, it cannot be easily separated therefrom.

The lower boiling point entraining liquids have the advantage that they can be readily separated from the anhydrous acid. The higher boiling point liquids, however, are more efficient and less heat is required to dehydrate a given quantity of dilute acid if a higher boiling point entraining liquid is employed.

It has been proposed heretofore to employ higher boiling point entraining liquids in a discontinuous operation, for example, in which only sufficient entraining liquid is added to a pot still containing dilute acid in order to remove the water therefrom; or if too much entraining liquid has been added, and the anhydrous acetic acid is mixed with the entraining liquid, a calculated amount of water may be added to the mixture to remove the excess entraining liquid azeotropically with the water.

It has also been heretofore proposed to operate the dehydrating column so that the entraining liquid is present up to a certain height. But there is no disclosure as to how this certain height is maintained.

It is an object of my invention to provide a method of dehydrating acetic acid and by which the entraining liquid is not permitted to contact the acetic acid of the higher concentrations, but is automatically retained in the zones in which relatively dilute acid is present.

My process is applicable to any entraining liquid although it is particularly applicable with reference to entraining liquids having a boiling point between 115 and 145° C., and in particular butyl acetate or xylol mixtures thereof, and mesityl oxide alone or mixed with a petroleum distillate, because of the thermal efficiency of these materials.

An embodiment of my method is illustrated diagrammatically by way of example in Figure 1 of the drawing appended hereto. Figure 2 is a vertical elevation, partly in section, of a detail of the apparatus employed.

The de-alcoholized pyroligneous acid is introduced through a pipe 15 into a still 1 which is heated by a steam coil. A portion of the tar contained in the pyroligneous acid, not being volatile at the temperature normally employed in vaporizing acetic acid, flows through the pipe 16 while the vapors of the pyroligneous acid flow through the pipe 17 and enter the dephlegmator 2. The pyroligneous acid vapor, as is well known, contains water and fatty acids along with wood oils and tar. The dephlegmator or column 2 receives at the top through the pipe 18 a controlled stream or reflux of entraining liquid which has been decanted at the bottom of the column 3, as will be described in more detail later. The dephlegmator 2 functions to purify the vapors of the pyroligneous acid by condensing the tar, wood oils and higher acids so that the product issuing from the dephlegmator 2 through the pipe 19 and entering the bottom of the column 3 is essentially only a mixture of water vapor, acetic acid and vaporized entraining liquid.

The tar, wood oils and higher acids which are condensed in the dephlegmator 2 by the stream or reflux of the entraining liquid will usually contain a small amount of water and acetic acid. This mixture containing the impurities flows through the pipe 20 and is introduced into the top of a column 4 which is heated at the bottom by a coil. This column removes from the tar, wood oils and higher acids, any water or acetic acid that may have been returned through the pipe 20 and returns the same in vaporous form to the column 2 through the pipe 21. The tar and wood oils are collected at the bottom of column 4 and discharged through a pipe 22 and the higher acids are drawn off through a pipe 23 and condensed in the cooler 13.

The purified vapors of pyroligneous acid enter the column 3 through the pipe 19 where they meet on the plates of this column a reflux of the entraining liquid which enters the column 3 through a pipe 26 and which dissolves the acetic acid and allows the water vapor to pass upward through the column in azeotropic combination with the entraining liquid. As the vapor passes upward through this column the amount of acid contained therein is proportionately decreased and at the top of the column through a pipe 24 the azeotropic mixture of entraining liquid and water having a minimum boiling point is removed. This is condensed at 3a and 3b and then led through a pipe 25 to a decanter 5. The latter permits the mixture to separate into two distinct layers. The entraining liquid flows back through the pipe 26 to the top of the column 3 and the water flows through the pipe 26a to the top of column 9 in which there is removed the small amount of entraining liquid (usually less than 2 or 3%) which is dissolved in the water. This entraining liquid is recovered by causing steam to bubble through it at the bottom of the column 9 and the recovered vapors of entraining agent flow through the pipe 27 and into the vapors exiting from the column 3 in the pipe 24. The water is drawn off at the bottom of column 9 through a pipe 28. This water will contain usually less than .03% acetic acid and chiefly formic acid.

The liquid at the bottom of the column 3 constitutes two distinct layers: a layer 44 of entraining liquid in which is dissolved a small amount of acid and which is returned through the pipe 18 to form the reflux for the dephlegmator 2 as described above, and a layer 45 of an aqueous solution of acetic acid the strength of which is not permitted to exceed a predetermined figure. The aqueous acid and the entrainer which collect on the plate 46 of the column 3 pass through the downflow 47 after which they separate into the two layers 44 and 45. A suitable partition 48 having an open space at the bottom permits the water and acid to flow through the pipe 29. The concentration of the acid in the layer 45 is controlled so that it is not permitted to exceed that at which two distinct layers will form and at which any appreciable amount of entrainer will dissolve in the aqueous acid. For example, when butyl acetate and xylol are employed the concentration of the acid is not permitted to exceed 45%. At this concentration only a few percent of the entrainer will be dissolved in the aqueous acid 45. If this concentration is greatly exceeded, a much larger quantity of the entrainer will dissolve, and the entrainer and aqueous acid will not separate into layers. The maximum concentration of the aqueous acid in the layer 45 is dependent upon the entraining liquid employed. If butyl acetate only is employed, for example, the concentration should not exceed 40%.

The acid solution is drawn off through a pipe 29 and introduced into the top of the column 6 heated at the bottom by a steam coil. In this column the acid is dehydrated by rectification and the vapors in the column which are poorer in acid than the liquid in pipe 29 are sent back to the column 3 through pipe 30. The small amount of entraining liquid which is dissolved in the aqueous acid returning through the pipe 29 to the column 6 is vaporized in this column in the extreme upper portion of this column and azeotropically combines with the water in the acid and is removed through the pipe 30.

A thermostatic regulator 6a actuated at one of the plates of column 6 controls the heat applied at the bottom of the column. This is usually controlled so that the temperature is around 108° C. near the middle of the column. The concentrated acetic acid in the form of vapors at the bottom of column 6 or a few plates above is removed through a pipe 31 and condensed in the cooler 7. This acid is substantially anhydrous and colorless and is the so-called technical acetic acid which is suitable for most industrial purposes. It will contain a small amount of formic acid but only traces of higher acids.

It will be seen that the employment of the decanter at the bottom of column 3 provides a convenient manner for permitting only a very limited quantity of the entraining liquid to reach the dehydrating column 6, (i. e., that dissolved in the aqueous acid) so that the acid in the column 6 may be dehydrated by straight rectification. In this manner, the entraining liquid is prevented from reaching the lower portions of the column 6 containing the anhydrous acetic acid and from which the entraining liquid could not be readily separated. It will also be appreciated that the use of the decanter eliminates manual control or supervision of the amount of the entraining liquid entering a dehydrating column and therefore automatically prevents it from reaching the anhydrous acid.

It will be appreciated that my process for dehydrating the acid may be used with or without the preliminary purification described above. However, the former is preferable for the reason that it avoids the subsequent purification of the concentrated acid which would otherwise contain the higher boiling point impurities if they had not been previously removed.

While I have shown two columns it is obvious that one column could be used if a decanter were suitably placed in the column to prevent the entraining liquid from passing directly into the lower portion of the column.

In order to avoid accumulation in the bottom of the column 6 of certain impurities which are but slightly volatile and which would form resins on the heating coil, a small quantity of the liquid is withdrawn through a pipe 32 and a greater part of this liquid is vaporized in the heater 8 which sends its vapors back to the column 6 through pipe 33. The impurities are discharged through the pipe 34 to the tar column 4.

If a so-called "tasteful" (edible) acetic acid is desired, the vapors are sent from the bottom of the column 6 through a pipe 35 to the bottom of the rectifying column 11, the reflux of which returns to the column 6 through the pipe 36. At the bottom of column 11 an acetic acid which is rich in formic acid is withdrawn through the pipe 37. The pure acid is withdrawn through the pipe 38 from a plate located near the top of the column. This acid is sent to the top of column 12 which removes an additional quantity of formic acid from the product and sends the formic acid vapors through a pipe 39 to the column 11. The "tasteful" acetic acid is taken from the base of the column 12 through a pipe 40 and this acid is condensed in a cooler 14.

The entraining liquid may become slightly modified during use and it is advantageous to eliminate the products in the entraining liquid which would progressively increase the steam consumption. To accomplish this, a small quantity of the entraining liquid is drawn off through a pipe 41 and introduced into a rectifying column 10 heated by a steam coil. The impurities pass to the condenser 10a through a pipe 42 and the purified entraining liquid is returned from the bottom of the column 10 through pipes 43 and 43a to the dephlegmator 2.

The tars issuing from the still 1 and from the bottom of the column may advantageously be submitted to a steam carry-off treatment to recover an aqueous acid therefrom which is recycled into the apparatus.

The de-alcoholized pyroligneous acid may be decanted preparatorily and the tar treated separately yields an aqueous acid which is added to the aqueous pyroligneous acid layer submitted to distillation in the still 1; however, the pyroligneous acid may also be distilled together with its tar without inconvenience.

It is advantageous to preparatorily free the pyroligneous acid from its wood alcohol content.

The dephlegmator 2 utilizes part of the entraining liquids which are recycled automatically as a result of the dehydration. An adjustment of the amounts thus recycled into the dephlegmator 2 will suffice to keep the concentration of the aqueous phase streaming towards 6 from exceeding a definite limit.

It will be appreciated that the purification in the dephlegmator is costless as far as heat is concerned.

The entraining liquids lend themselves to high-temperature decantation (89° C.): the connections from the decanter to the condenser make it possible, whereby the expenditure at the bottom of columns 4 and 6 is limited to the mere vaporization of the entraining liquids decanted at 5. Where "tasteful" acetic acid is produced it is suitable to heat the recovery column 9 with the aid of column 11 from the top of which the vapours issue at about 107° C.; the columns 12 and 9 may also be arranged above each other so that some steam may be spared.

In no instance the expenditure to obtain "tasteful" acid will be higher than twice the steam necessary to vaporize the pyroligneous acid, even if the concentration of the same should be as high as 15 per cent.

It is unimportant that the pyroligneous acid is taken in at the bottom of column 2 in the liquid instead of the vapour phase; it is only necessary then to suitably design the heater for column 4.

The use of the butyl acetate-xylol mixture as mentioned above is not limitative and the principle of the invention is not modified by the use of any other suitable mixture. An oxygen-containing substance and a hydrocarbon will preferably be chosen; for instance, a mixture of mesityl oxide with a petrol boiling from about 125° to 135° C. is quite suitable.

The expression "entraining liquid" used herein refers to a stable, non-reactive liquid or mixture of liquids having the property of forming azeotropic mixtures with water in the presence of acetic acid, which have a minimum boiling point. The materials suitable for this purpose are well known in the prior art and the requirements for such an entraining liquid are set forth in detail in French Patent No. 622,680.

Generally speaking, the oxygen-containing substance imparts solving properties to the auxiliary mixture, while the hydrocarbon will decrease said properties somewhat at the same time as they will allow it to remain not very soluble in the concentrated acid present in the bottom of 3.

This application is a continuation-in-part of my application Serial No. 726,395, filed May 18, 1934, now Patent No. 2,096,734 of Oct. 26, 1937.

I claim:

1. In a process of obtaining concentrated acetic acid from aqueous acetic acid, the steps comprising distilling the acid with an entraining liquid forming a minimum boiling azeotrope with water in order to partially dehydrate the acid to a concentration not exceeding that at which at least a portion thereof is immiscible with the entraining liquid decanting the partially dehydrated acid from the entraining liquid and further dehydrating the decanted acid by simple rectification.

2. In a process of obtaining concentrated acetic acid from aqueous acetic acid, the step of distilling acetic acid in a confined space with an entraining liquid forming a minimum boiling point azeotrope with water to partially dehydrate the acid azeotropically, the concentration of said partially dehydrated acid not exceeding that which will permit it to separate from the entraining liquid, and decanting the partially dehydrated acid from the entraining liquid and completing the dehydration of the decanted acid in another confined space by simple rectification.

3. In a process of obtaining concentrated acetic acid from aqueous acetic acid, the step of distilling acetic acid in a confined space with an entraining liquid forming a minimum boiling point azeotrope with water to partially dehydrate the acid azeotropically, the concentration of said partially dehydrated acid not exceeding that which will permit it to separate from the entraining liquid, and decanting the partially dehydrated acid from the entraining liquid and completing the dehydration of the decanted acid in another confined space by simple rectification, the water removed from the acid during said rectification being passed into the first mentioned confined space.

4. In a process of obtaining concentrated acetic acid from aqueous acetic acid, the step of distilling acetic acid in a confined space with an entraining liquid forming a minimum boiling point azeotrope with water and having a boiling point higher than that of acetic acid to remove as much water as possible azeotropically and yet permit the partially dehydrated acid to separate from the entraining liquid, decanting the partially dehydrated acid from the entraining liquid and completing the dehydration of the decanted acid in another confined space by simple rectification.

5. In a process of obtaining concentrated acetic acid from aqueous acetic acid, the step of distilling acetic acid in a confined space with an entraining liquid forming a minimum boiling point azeotrope with water and having a boiling point higher than that of acetic acid to remove as much water as possible azeotropically and yet permit the partially dehydrated acid to separate from the entraining liquid, decanting the partially dehydrated acid from the entraining liquid and completing the dehydration of the decanted acid in another confined space by simple rectification, the water removed from the acid during said rectification being passed into the first mentioned confined space.

6. In a process of obtaining substantially pure and anhydrous acetic acid from pyroligneous acid, the steps which comprise purifying said pyroligneous acid within a distilling column by contacting it in the vapor phase with a water entraining liquid, partially dehydrating the purified acid in a second distillation column with a water entraining liquid forming a minimum boiling point azeotrope to dehydrate the acid to a concentration at which at least a portion thereof is immiscible with the water entraining liquid, concentrating the partially dehydrated acid by simple rectification in a third distilling column, decanting the partially dehydrated acid from the water entraining liquid at the bottom of the second column, transferring the decanted water entraining liquid to said first column to be employed in the purifying operation, and transferring the decanted partially dehydrated acid to said third column to be concentrated by simple rectification.

7. In a process of obtaining substantially pure and anhydrous acetic acid from pyroligneous acid, in which process the pyroligneous acid is purified in a column by contacting it in the vapor phase with a reflux of a water entraining liquid, the purified pyroligneous acid is then partially dehydrated in a second column with a water entraining liquid forming a minimum boiling point azeotrope to dehydrate the acid to a concentration at which at least a portion thereof is immiscible with the water entraining liquid, and the partially dehydrated acid is then concentrated by simple rectification in a third column, the steps which comprise condensing the vapor of water and the water entraining liquid issuing from said second column, decanting the condensed water and water entraining liquid and returning the condensed water entraining liquid to said second column, decanting the partially dehydrated acid from the water entraining liquid at the bottom of said second column, transferring the decanted water entraining liquid to said first column to be employed as the reflux in the purifying operation, transferring said partially dehydrated acid to said third column to be concentrated by simple rectification, and transferring the vapors from said first and third columns to said second column.

CHARLES COUTOR.